(No Model.)

H. E. GOULD.
WATER PURIFIER.

No. 546,973. Patented Sept. 24, 1895.

WITNESSES:
A. E. Spencer
L. S. Burchard

INVENTOR
Henry E. Gould
BY H. A. West
ATTORNEY

United States Patent Office.

HENRY E. GOULD, OF NEW YORK, N. Y., ASSIGNOR OF ONE-HALF TO THEODORE LINKE, OF SAME PLACE.

WATER-PURIFIER.

SPECIFICATION forming part of Letters Patent No. 546,973, dated September 24, 1895.

Application filed October 8, 1894. Serial No. 525,219. (No model.)

*To all whom it may concern:*

Be it known that I, HENRY E. GOULD, a citizen of the United States and a resident of New York, in the county of New York and State of New York, have invented certain new and useful Improvements in Water-Purifiers, of which the following is a specification.

The object of my invention is to provide a practical device for purifying water or other liquid, designed mainly to be attached to a water-supply pipe or faucet for purifying water as it is drawn for immediate use or consumption; and my invention consists of the construction, arrangement, and combination of parts, all as hereinafter described and claimed.

Figure 1:
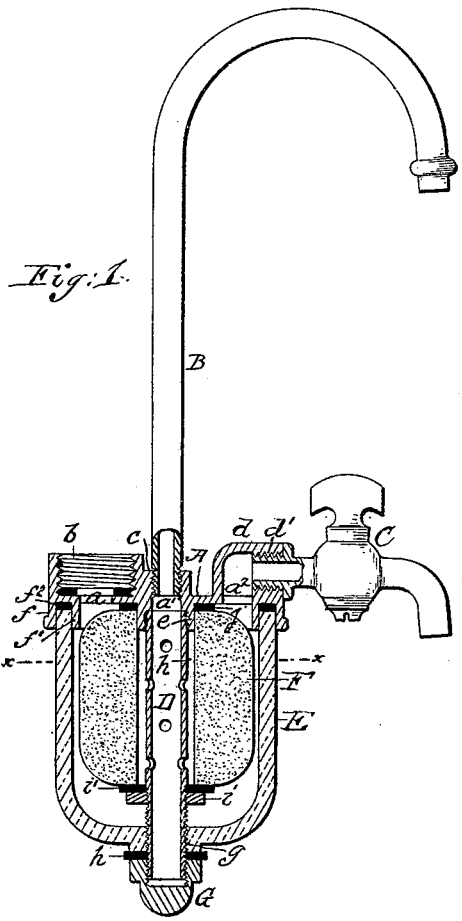
Figure 2:
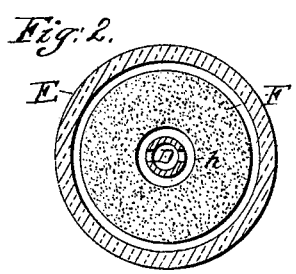

In the accompanying drawings, to which reference is made, Figure 1 is a sectional elevation of my new and improved water-purifier, and Fig. 2 is a sectional plan view taken on line $x\,x$ of Fig. 1.

A represents a metal cup-plate formed with three passages $a$, $a'$, and $a^2$. The passage $a$ is for the inlet of water or other liquid to be purified, and passage $a'$ is for the outlet of the purified liquid, while passage $a^2$ is for drawing unpurified liquid and for flushing out and cleaning the purifier of sediment and accumulated impurities. Surrounding the passage $a$ is an internally-screw-threaded collar $b$, designed for connecting the device with a pipe or faucet or other source of supply. (Not shown.) The passage $a'$ is surrounded with a like but smaller collar $c$, to receive the discharge-pipe B for purified liquid. The passage $a^2$ is covered with a hood $d$, which forms a horizontal internally-screw-threaded socket $d'$, to receive a cock or faucet C, through which unpurified water may be drawn. The under surface of plate A is formed at the center or coincident with passage $a'$, and discharge-pipe B with a screw-threaded socket $e$, to receive and hold a perforated tube D. It is also formed with spaced concentric flanges $f\,f'$, between which may be placed rubber or other packing $f^2$.

E represents a metal or glass bowl, preferably transparent glass, which surrounds a body of filtering material F, preferably porous stone, held upon the tube D. The upper edge of the bowl E forms a tight joint with the plate A and packing $f^2$, and is formed with an aperture $g$ at the bottom to fit upon the lower screw-threaded end of the tube D. A cap-nut G closes the lower end of the tube D, and when screwed up closes the upper end of the bowl E tightly into the space between the concentric flanges $f\,f'$, and by means of packing $h$ or otherwise said cap-nut will also tightly close the aperture $g$ at the bottom of the bowl.

The filtering material F is formed with a central passage $h$ for the tube D, and it is held on said tube preferably by a nut or screw-flange $i$ and packing $i'$, which tightly close the lower end of said central aperture $h$. The upper end of said aperture $h$ is tightly closed by packing $j$, interposed between the filtering-block F and the inner surface of the cup-plate A.

In operation liquid admitted to the bowl under pressure (the faucet C being closed) will pass through the filtering material F into tube D, entering the tube through the perforations therein, and will be discharged in a purified state from the pipe B. When unpurified water is to be drawn, it is only necessary to open the cock C, whereupon the water entering the bowl will pass through the device without passing through the filtering material, and in case the filtering material and the bowl require to be cleansed of sediment and impurities it is only necessary to open the cock C, whereupon the flow will rapidly flush out and clean the whole interior of the device.

Having thus described my invention, what I claim, and desire to secure by Letters Patent, is—

1. A purifier for water or other liquid, which consists of a top plate, A, formed with apertures, $a$, $a'$, $a^2$, a central perforated tube, D, attached to the top plate, and screw threaded at its lower end, and an apertured block of filtering material placed upon said tube and closed at its ends, in combination with a bowl, E, formed with aperture, $g$, and a cap nut, G, on the lower end of the said tube, substantially as described.

2. The top plate A formed with apertures, $a$, $a'$, $a^2$ and having collars $b$, $c$ and hood $d$ formed upon its upper surface and formed with concentric flanges $f f'$ at its edge in combination with the discharge tube B connected to collar $c$, faucet C connected in the hood $d$, a perforated tube D in line with the discharge tube B, a bowl E fitted to the said flanges $f$ $f'$, and perforated tube D, and a cap nut G screwed upon the protruding end of the said tube D, substantially as described.

HENRY E. GOULD.

Witnesses:
H. A. WEST,
H. E. SPENCER.